United States Patent
Mackler

(10) Patent No.: US 9,092,427 B2
(45) Date of Patent: Jul. 28, 2015

(54) DYNAMIC TRUST SESSION

(75) Inventor: Russell T. Mackler, Avondale, AZ (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 13/563,000

(22) Filed: Jul. 31, 2012

(65) Prior Publication Data

US 2014/0040984 A1    Feb. 6, 2014

(51) Int. Cl.
*G06F 11/28* (2006.01)
*G06F 21/44* (2013.01)
*G06F 21/00* (2013.01)

(52) U.S. Cl.
CPC .............. *G06F 11/28* (2013.01); *G06F 21/445* (2013.01); *G06F 21/00* (2013.01); *G06F 21/44* (2013.01); *G06F 2211/003* (2013.01)

(58) Field of Classification Search
CPC ....... G06F 11/28; G06F 21/445; G06F 21/00; G06F 21/44; G06F 2211/003
USPC .......................................................... 726/3
See application file for complete search history.

(56) References Cited

U.S. PATENT DOCUMENTS

| | | | |
|---|---|---|---|
| 7,233,664 B2 | 6/2007 | Soliman | |
| 7,251,635 B2 | 7/2007 | Lam et al. | |
| 7,325,058 B1* | 1/2008 | Sheth et al. | 709/225 |
| 7,383,366 B2 | 6/2008 | Friedlander et al. | |
| 7,624,438 B2 | 11/2009 | White et al. | |
| 7,765,590 B2 | 7/2010 | Thomas et al. | |
| 7,827,400 B2 | 11/2010 | Allen et al. | |
| 7,870,399 B2 | 1/2011 | Bryant et al. | |
| 8,015,187 B2 | 9/2011 | Choi et al. | |
| 8,675,645 B2* | 3/2014 | Bahr | 370/380 |
| 2005/0094637 A1* | 5/2005 | Umesawa et al. | 370/389 |
| 2005/0144282 A1* | 6/2005 | Argo | 709/226 |
| 2005/0198306 A1* | 9/2005 | Palojarvi et al. | 709/227 |
| 2006/0101510 A1* | 5/2006 | Kadyk et al. | 726/12 |
| 2006/0174323 A1* | 8/2006 | Brown et al. | 726/3 |
| 2006/0210084 A1 | 9/2006 | Fransdonk | |
| 2007/0006286 A1* | 1/2007 | Singhal | 726/4 |
| 2007/0044155 A1 | 2/2007 | Pletka et al. | |

(Continued)

FOREIGN PATENT DOCUMENTS

EP    2372947 A1    3/2010

OTHER PUBLICATIONS

Earle et al., "Verifying Fault-Tolerant Erlang Programs," Sep. 2005, ACM, p. 26-34.*

(Continued)

*Primary Examiner* — Eleni Shiferaw
*Assistant Examiner* — Demaris Brown
(74) *Attorney, Agent, or Firm* — Oblon, McClelland, Maier & Neustadt, L.L.P.

(57) ABSTRACT

A secure session of communication between two entities in a network is disclosed. Using client-server terminology, a client sends a connection-request to a server that authenticates the connection-request and transmits a session-request to the client in response. The client reverse-authenticates the session-request and then passively waits to receive a tunnel-request transmitted by the server. The tunnel-request sets up one or more overlapping tunnels between the client and the server to support the desired communications. Each of the tunnels exists only for a specified time and is replaced by another tunnel that is set up after a selected time delay after the start of a previous tunnel.

19 Claims, 16 Drawing Sheets

102: Network
104-124: System Entities
126-132: Non-System Entities

(56) References Cited

U.S. PATENT DOCUMENTS

| | | | |
|---|---|---|---|
| 2007/0066226 A1* | 3/2007 | Cleveland et al. | 455/63.1 |
| 2007/0168669 A1 | 7/2007 | Jonas | |
| 2008/0022389 A1* | 1/2008 | Calcev et al. | 726/14 |
| 2008/0120711 A1* | 5/2008 | Dispensa | 726/7 |
| 2008/0155670 A1* | 6/2008 | Umesawa et al. | 726/6 |
| 2008/0182576 A1* | 7/2008 | Tsirtsis et al. | 455/435.1 |
| 2009/0019113 A1* | 1/2009 | Wu et al. | 709/204 |
| 2009/0037732 A1* | 2/2009 | Boccon-Gibod et al. | 713/168 |
| 2009/0052675 A1* | 2/2009 | Levow et al. | 380/278 |
| 2009/0106439 A1* | 4/2009 | Twitchell, Jr. | 709/230 |
| 2009/0193127 A1 | 7/2009 | Merkh et al. | |
| 2009/0217358 A1 | 8/2009 | Kumar et al. | |
| 2010/0058064 A1 | 3/2010 | Kirovski et al. | |
| 2010/0058458 A1 | 3/2010 | White et al. | |
| 2010/0103872 A1* | 4/2010 | Park | 370/328 |
| 2010/0217987 A1 | 8/2010 | Shevade | |
| 2010/0254537 A1 | 10/2010 | Buer et al. | |
| 2010/0260338 A1 | 10/2010 | Haddad et al. | |
| 2011/0019820 A1* | 1/2011 | Ureche et al. | 380/255 |
| 2011/0035601 A1 | 2/2011 | Davidson et al. | |
| 2011/0038276 A1* | 2/2011 | Ninagawa | 370/252 |
| 2011/0078239 A1 | 3/2011 | Heen et al. | |
| 2011/0154470 A1 | 6/2011 | Grimes et al. | |
| 2011/0191579 A1 | 8/2011 | Xiao et al. | |
| 2011/0191849 A1* | 8/2011 | Jayaraman et al. | 726/23 |
| 2011/0219447 A1 | 9/2011 | Horovitz et al. | |
| 2011/0265180 A1 | 10/2011 | Unagami et al. | |
| 2011/0296186 A1* | 12/2011 | Wong et al. | 713/171 |
| 2012/0092997 A1* | 4/2012 | Mihaly et al. | 370/237 |
| 2012/0096166 A1* | 4/2012 | Devarapalli et al. | 709/226 |
| 2012/0233674 A1* | 9/2012 | Gladstone et al. | 726/6 |
| 2012/0260314 A1* | 10/2012 | Babula et al. | 726/3 |
| 2012/0320876 A1* | 12/2012 | Zhou et al. | 370/331 |
| 2013/0014145 A1* | 1/2013 | Bhatia et al. | 725/13 |
| 2013/0333009 A1* | 12/2013 | Mackler | 726/7 |

OTHER PUBLICATIONS

Lian et al., "Traffic Classification Using Visual Motifs: An Empirical Evaluation," Sep. 2010, ACM, p. 70-78.*

Massimiliano, "Optimally Regularized Channel Tracking Techniques for Sequence Estimation Based on Cross-Validated Subspace Signal Processing," 2000, IEEE, vol. 48 Iss. 1, p. 95-105.*

Samingan et al., "Frequency-Domain Channel Tracking for MIMO-OFDM Systems, Validated with an Experimental Data in 5.2 GHz Wireless Channel," 2011, IEEE, p. 577-582.*

*Virtual Private Network*, (Date Unknown), Wikipedia.

Robert W. Twitchell, *Virtual Dispersive Networking™ with SSN*, Dispersive Solutions, Inc. Business Proprietary Information, Jun. 2009, pp. 1-8.

*SecurID*, 6 pages, (Date Unknown), Wikipedia.

*Cryptographically secure pseudorandom number generator*, 13 pages, (Date Unknown), Wikipedia.

*RSA (algorithm)*, 5 pages, (Date Unknown), Wikipedia.

DSI, *Virtual Dispersive Networking: Overview, Technical Architecture and System Diagrams*, pp. 1-44.

Babbage et al., *The eSTREAM Portfolio*, Apr. 15, 2008, 10 pages.

U.S. Appl. No. 13/492,176, filed Jun. 8, 2012 by Russell T. Mackler.

* cited by examiner

102: Network
104-124: System Entities
126-132: Non-System Entities

DYNAMIC TRUST SESSION

CROSS-REFERENCE TO RELATED APPLICATION

This Application is related to application Ser. No. 13/492,176 filed on Jun. 8, 2012, having Russell T. Mackler as the sole inventor. Application Ser. No. 13/492,176 is hereby incorporated by reference in its entirety.

BACKGROUND

Maintaining security of a session on public networks such as the Internet is important to prevent resources from being hijacked by intruders.

SUMMARY

A secure session of communication between two entities in a network is disclosed. Using client-server terminology as an example, a client initiates the communication by sending a connection-request to a server that authenticates the connection-request and transmits a session-request to the client in response. The client reverse-authenticates the session-request and then passively waits for a tunnel-request generated and transmitted by the server. The tunnel-request sets up one or more overlapping tunnels between the client and the server to support the communication between the client and the server. Each of the tunnels exists only for a specified time and is replaced by another tunnel that is set up after a selected time delay after the start of a previous tunnel.

After authenticating a connection-request, the server retrieves session-request-parameters and generates a session-request. The session-request may include authentication credential information such as usernames, passwords, biometric data, etc. that are imbedded in pseudo-randomly selected locations in the session-request. The session-request is transmitted toward client 104 through one or more redirectors which are other entities in the network. Redirectors may authenticate the session-request, and if authenticated modify the session-request and transmit the session-request to other redirectors or the client. In this way, a path that the session-request traverses the network results in a redirector-pattern that may be used to authenticate the session-request as well as encode other information related communication between the client and the server. After the session-request is received, the client authenticates the server. This is a reverse-authentication. Once authenticated, the client opens selected receiving channels and passively listens for a tunnel-request generated and transmitted by the server.

The server waits for a period of time after transmitting the session-request before transmitting a tunnel-request. The tunnel-request is generated based on selected session-parameters, and is transmitted through the network to establish a tunnel for communications between the client and the server. The redirector-pattern established by the tunnel-request is used for authentication by the redirectors and the client, is the path for the tunnel, and is locked for that tunnel. Communication through a tunnel is unencumbered by further authentication other than confirming that a tunnel-identity assigned to the tunnel is valid.

Each tunnel is established only for a tunnel duration time. Before a tunnel expires, a new tunnel is set-up by the server transmitting another tunnel-request. Successive tunnels overlap based on a delay time for a new tunnel which is the time delayed from a start of a previous tunnel so that communications already started in a previous tunnel may complete before the tunnel expires. Each session between a client and server is also established only for a session time. The session time and the tunnel duration time may be set based on geographical locations of the client and the server as well as other information such as network locations of the client, the server and redirectors, an estimated hacking time, network delay, etc.

Each established tunnel is different at least from a previous tunnel if not unique from all other tunnels. The redirector-patterns, the encryption algorithms used, the time durations, the communication protocols, etc. may all be pseudo-randomly selected and thus different between at least overlapping tunnels. Additionally, tunnels may be destined to different combinations of receiving channels at the client and at the server. In this way, communications within a session may be made more secure.

BRIEF DESCRIPTION OF THE DRAWINGS

Exemplary embodiments are described in detail below with reference to the accompanying drawings wherein like numerals reference like elements, and wherein.

DETAILED DESCRIPTION OF THE EMBODIMENTS

Figure 1:
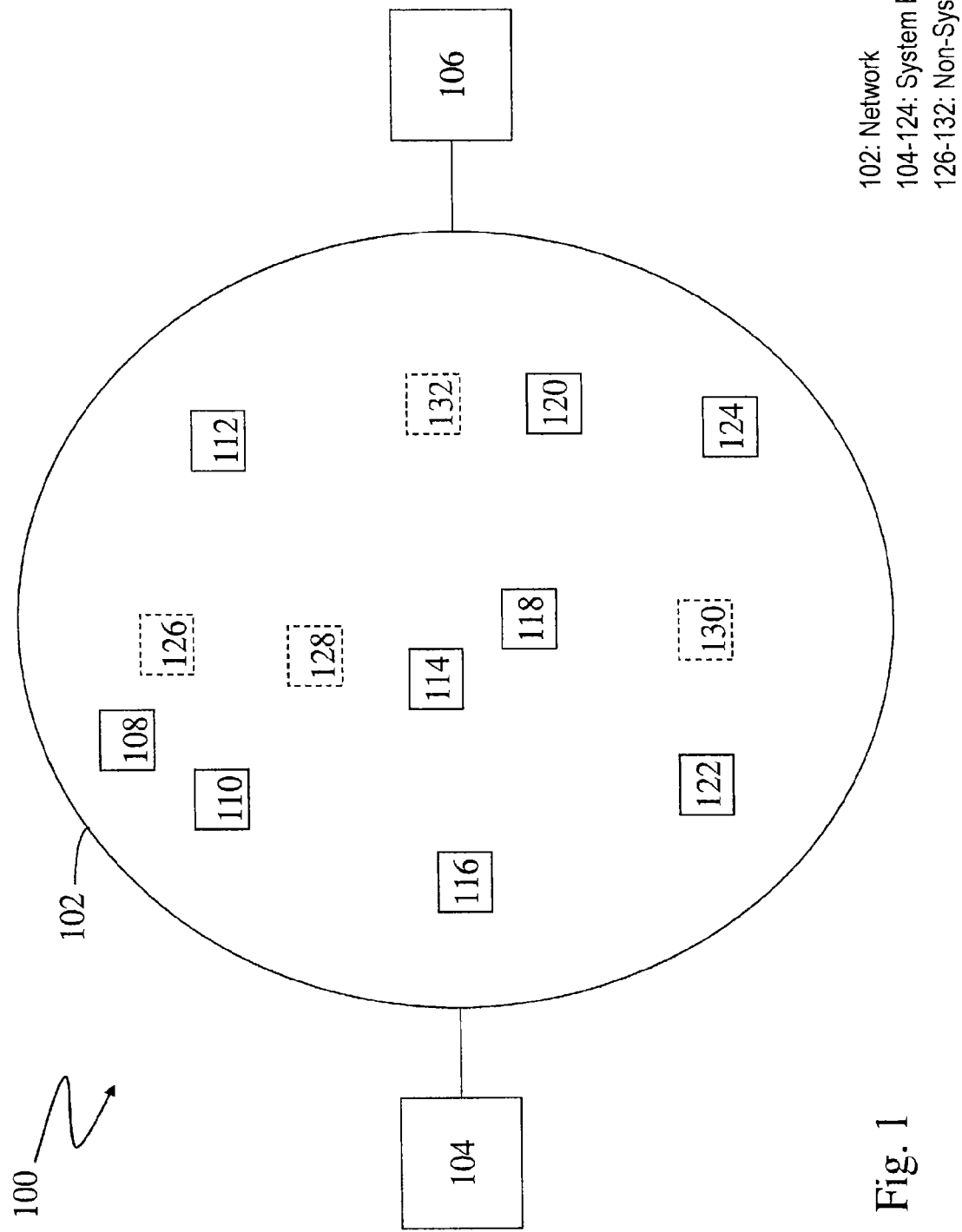
FIG. 1 shows an exemplary diagram of two terminals prior to communicating in a session after an authentication process through a network.

FIG. 1 shows entities 104-124 of a system 100 that are interconnected together through a network 102. Other entities 126-132 that are not part of system 100 also may be connected in network 102. Entities 104-124 may be any electronic equipment that has a capability to be connected to each other through network 102. For example, entities 104-124 may be workstations and/or servers that form system 100 of a corporate enterprise. In FIG. 1, entity 104 may be a client (client 104) and entity 106 may be a server (server 106) using the client-server terminology as an example. Entities 108-124 may be called redirectors 108-124 in a communication between client 104 and server 106. Other relationship models may be used such as peer-to-peer model, for example. Client 104 and server 106 may establish a connection through an authentication process and a session where information may be exchanged. The authentication process may be similar to one that is described in application Ser. No. 13/492,176 (the 176 application) filed on Jun. 8, 2012 having Russell T. Mackler as the sole inventor. The 176 application is hereby incorporated by reference in its entirety.

Authentication is a process where a party's identity is verified. For example, a common authentication process may be to confirm a username and a password. In the 176 application, authentication is achieved by confirming a redirector-pattern traversed by an connection-request. While the following discussion will assume that the authentication process disclosed in the 176 application is used, other authentication processes may also be used, and could be simply be a password, for example.

When a session is desired with server 106, client 104 first generates and transmits a connection-request toward server 106. When received, server 106 responds by generating and transmitting a session-request toward client 104. The word "toward" is used, because although the ultimate destination is either server 106 or client 104, the immediate destination may be a redirector 108-124.

Figure 2:
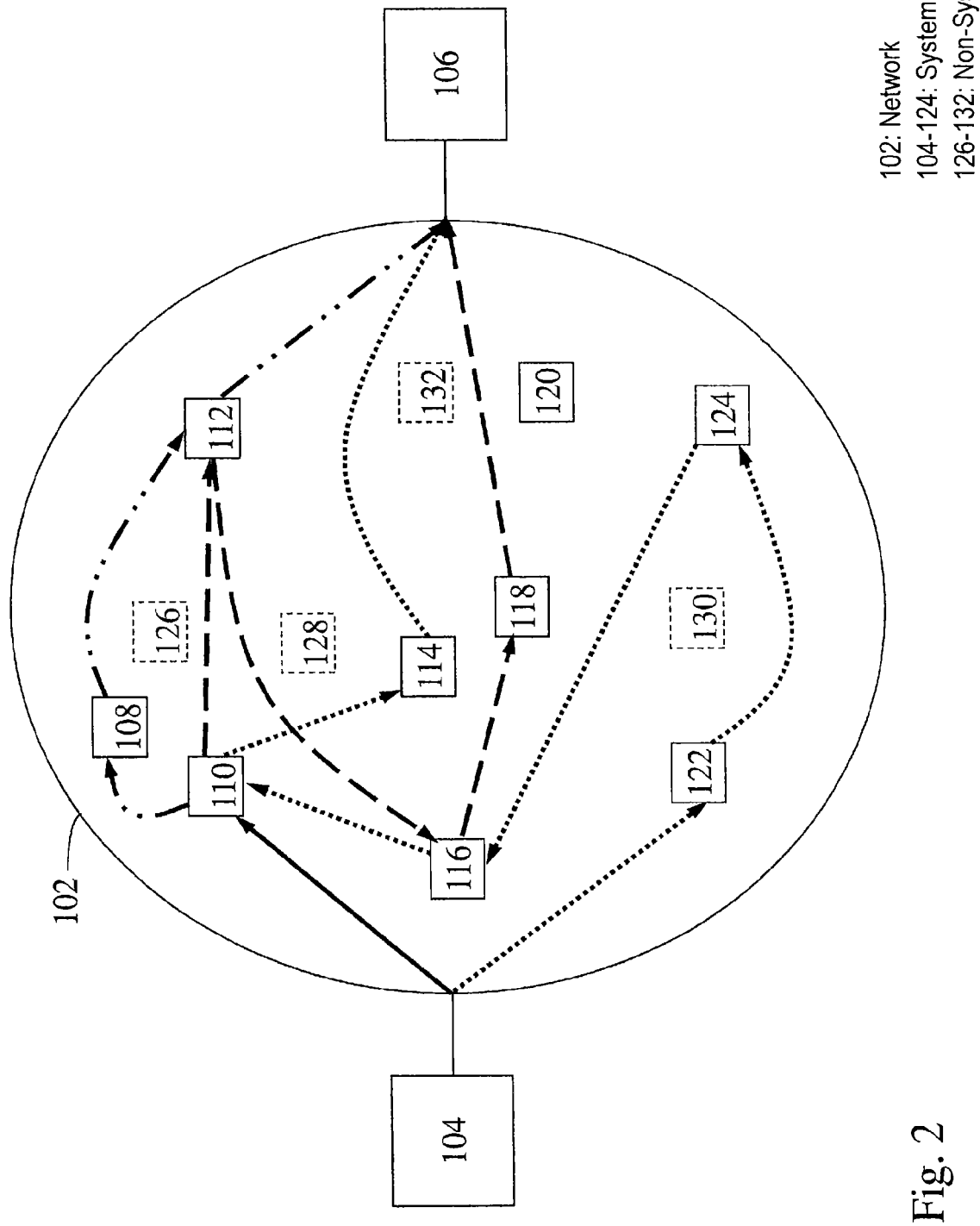
FIG. 2 shows the two terminals authenticating through network redirectors.

FIG. 2 shows an example of client 104 sending a connection-request to server 106 using the authentication process disclosed in the 176 application. Here, client 104 pseudo-randomly selects connection-request parameters and selects initial ones of redirectors 108-124 to transmit the connection-request toward server 106. The word "toward" is used instead of "to" because although the ultimate destination is to server 106, the immediate destinations may be to redirectors 108-124. Each of the selected ones of redirectors 108-124 pseudo-randomly selects further redirectors or server 106 and transmits one or more modified connection-requests. The modified connection-requests include at least an identification of the redirector that modified the connection-requests, so that when server 106 receives modified connection-requests, a redirector-pattern may be extracted and client 104 may be authenticated based on the extracted redirector-pattern. FIG. 2 shows redirector patterns:

1. 110, 108, and 112;
2. 110, 112, 116, and 118; and
3. 122, 124, 110, and 114.

Figure 3:
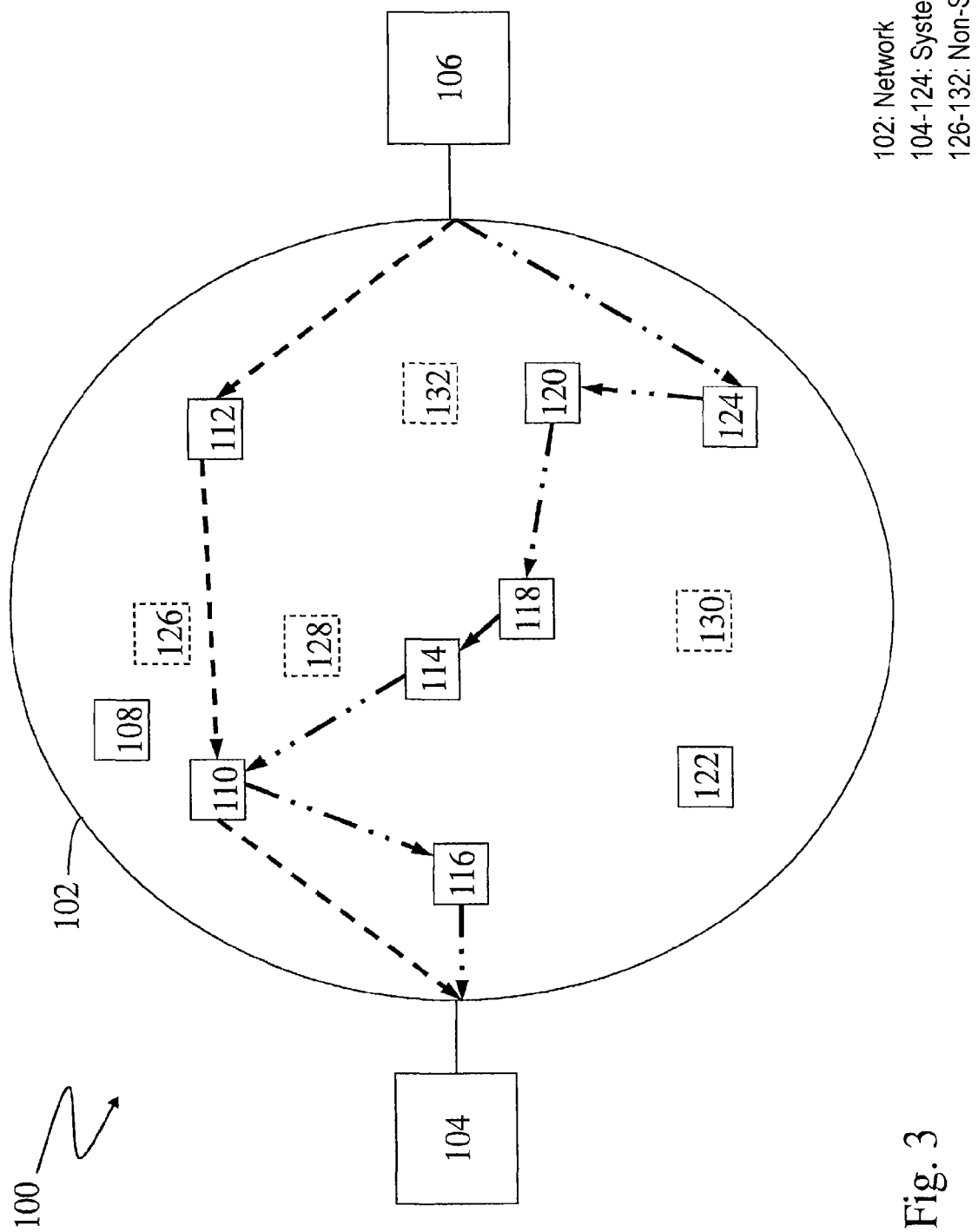
FIG. 3 shows reverse-authentication prior to setting up a session.

After client 104 is authenticated, server 106 extracts information contained in a payload portion of the received modified connection-request (also referred to as connection-request for convenience) and determines which receive channels client 104 will monitor to receive a session-request. Based on information in the payload of the connection-request, server 106 transmits the session-request to pseudo-randomly selected ones of redirectors 108-124 toward client 104. As shown in FIG. 3, the session-request forms one or more redirector-patterns that end at client 104. When received, the client 104 authenticates server 106 based on redirector-patterns formed by the session-request. This is a reverse-authentication. This reverse-authentication adds further security in that intruders posing as a server must generate proper redirector-patterns in order to gain a client's trust.

After the session-request is authenticated, client 104 opens selected receive channels and passively listen. Passively listening means that no response such as an acknowledgement is provided for any communication that has a receive channel as a destination. Server 106 may wait for a set period of time after transmitting the session-request, and then generates and transmits a tunnel-request to form a tunnel $tun_1$ between itself and client 104. The set period of time may be determined based on congestion in network 102 and experienced delay of previous transmissions such as for connection-requests, session-requests and/or previous tunnel-requests. The tunnel-request is formed similarly as a session-request but contain information relating to establishing a tunnel having characteristics specified by tunnel-parameters imbedded in a payload of the tunnel-request, for example. Tunnel $tun_1$ has a redirector-pattern that is formed by the tunnel-request traversing redirectors 108-124 through network 102. Each tunnel may have a unique identification such as a tunnel number, for example, so that once formed, a tunnel remains intact including the redirector-pattern for efficient transmission of communication data between client 104 and server 106. Once tunnel $tun_1$ is formed, it remains for a time duration of $t_1$. Before the time duration $t_1$ expires, another tunnel $tun_2$ is formed having a different redirector-pattern and a different tunnel identification so that a session is spanned by a sequence of n overlapping tunnels $tun_1$ to $tun_n$ each tunnel having a time duration $t_j$ for j=1, 2, ... n.

Figure 5:
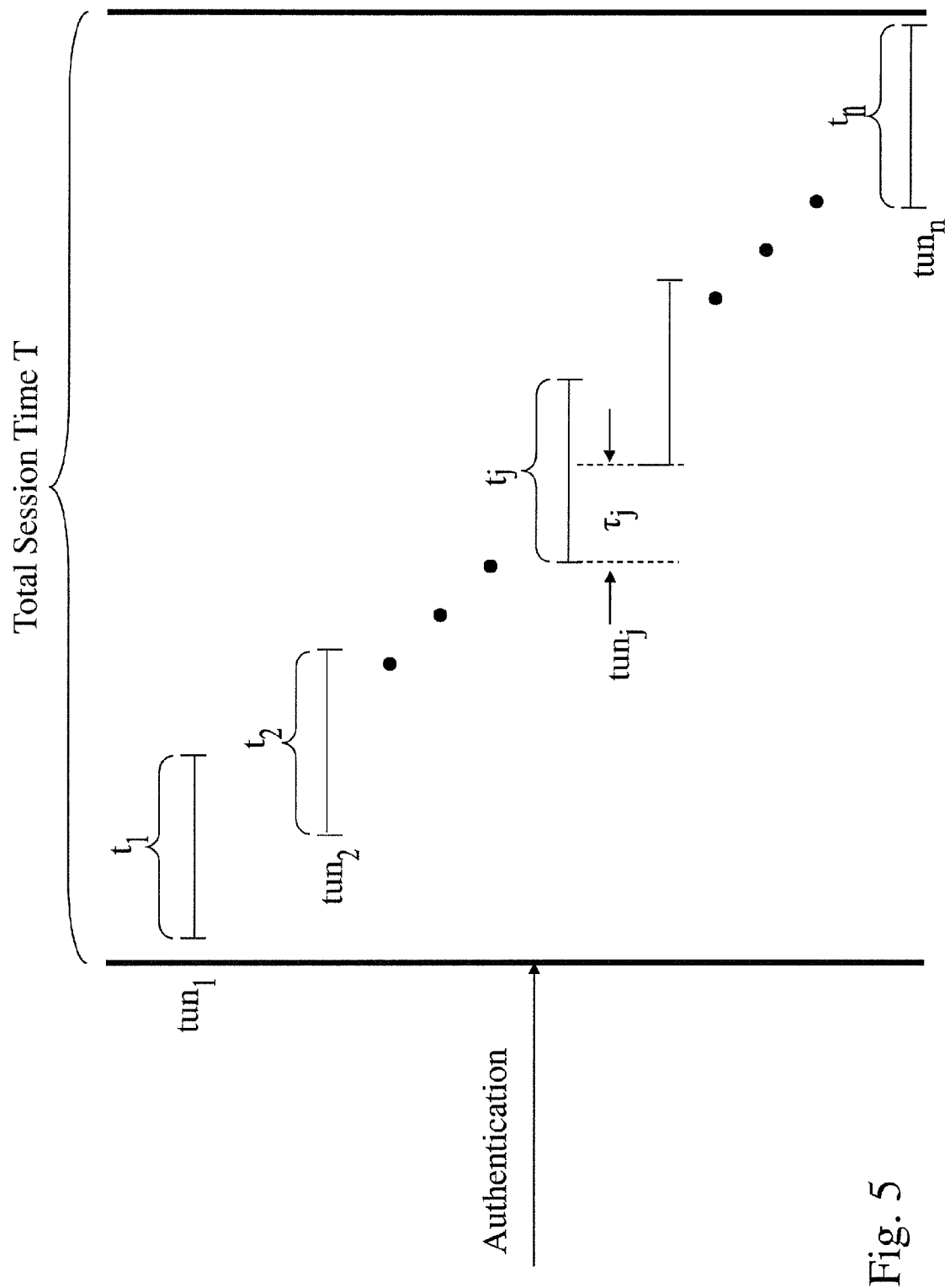
FIG. 5 shows a diagram of an exemplary sequence of tunnels.

FIG. 5 shows overlapping tunnels $tun_1$ to $tun_n$ that spans a session having a duration of time T. Each tunnel has a duration of time $t_j$. Each successive tunnel $tun_j$ may be started after a time delay of $\tau_j$ after the start of the previous tunnel $tun_{j-1}$. The times T, $t_j$, and $\tau_j$ may be determined based on geographical and/or network locations of client 104 and/or server 106. For example, if either client 104 or server 106 is located in a geographical and/or network area where intruders are known to be active, then shorter duration times may be used compared to other less intruder infested areas.

The times T, $t_j$, and $\tau_j$ may also be determined based on an estimated hacking time, for example. If it is determined that an estimated hacking time is greater than 5 minutes based on the type of encryption used, the level of sophistication of potential hackers, and/or prior experience, then the tunnel duration time $t_j$ may be set to less than 5 minutes, and the session duration time T may be set to a number of tries that is estimated to be safe such as 10, for example. If time delay $\tau_j$ of successive tunnel start time is set to about 2.5 minutes, then session duration time T would be about 25 minutes. The times T, $t_j$, and $\tau_j$ may also be modified in real-time depending on real-time information or experience.

Figure 6:
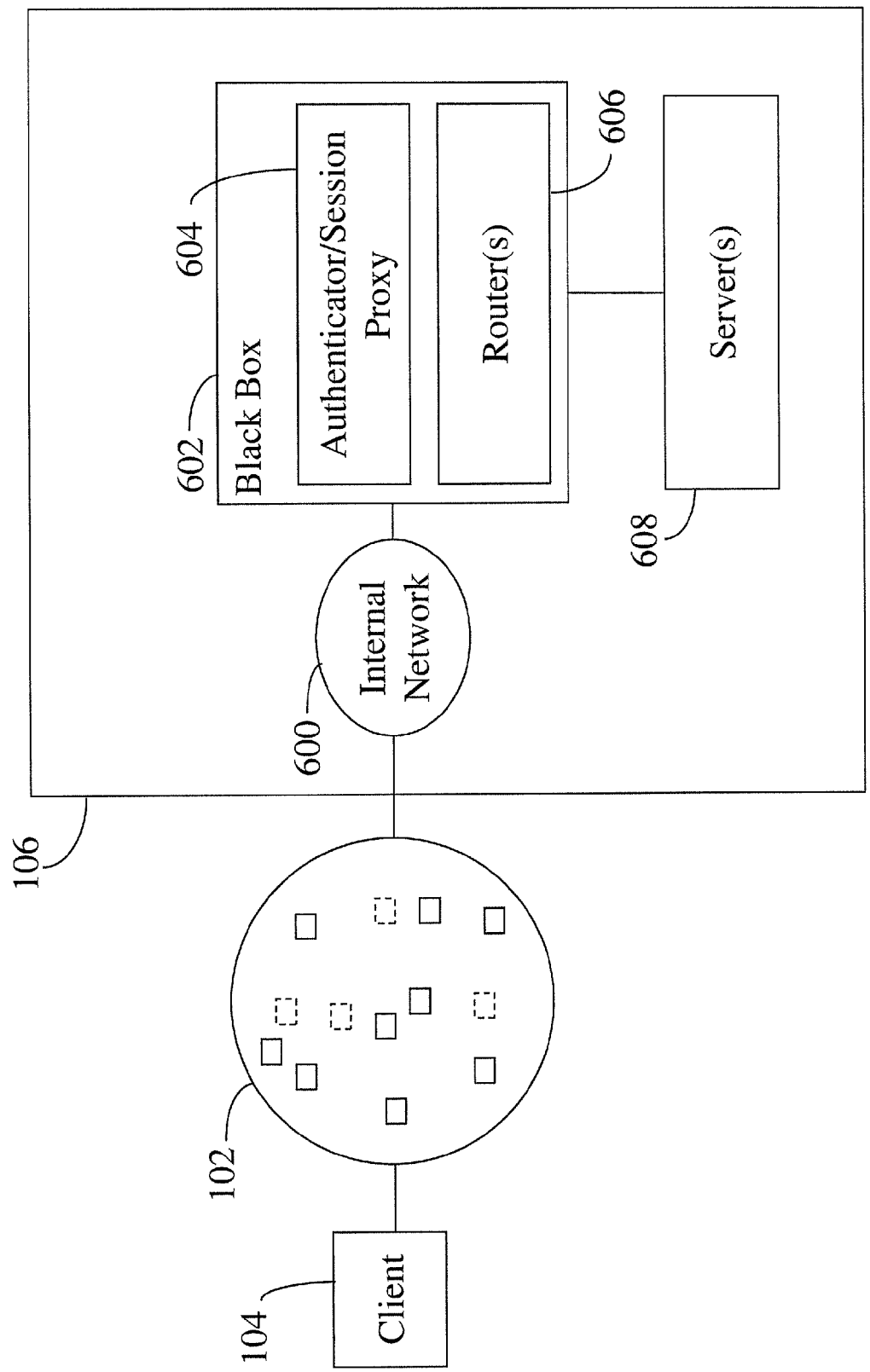
FIG. 6 shows a diagram of an exemplary server-side configuration.

FIG. 6 shows a block diagram of an exemplary server 106 that may include an internal network 600, a black box 602 and one or more servers 608. Black box 602 may include an authenticator/session proxy 604 and routers 606. Communications from network 102 may be routed to black box 602 via internal network 600. Routers 606 provide channels that are controlled by authenticator/session proxy 604. For example authenticator/session proxy 604 may set routers 606 to open specific channels for passively receiving communications without any return acknowledgement, for example. All communication to and from servers 608 are passed through black box 602 for encryption and tunneling processes.

Figure 7:
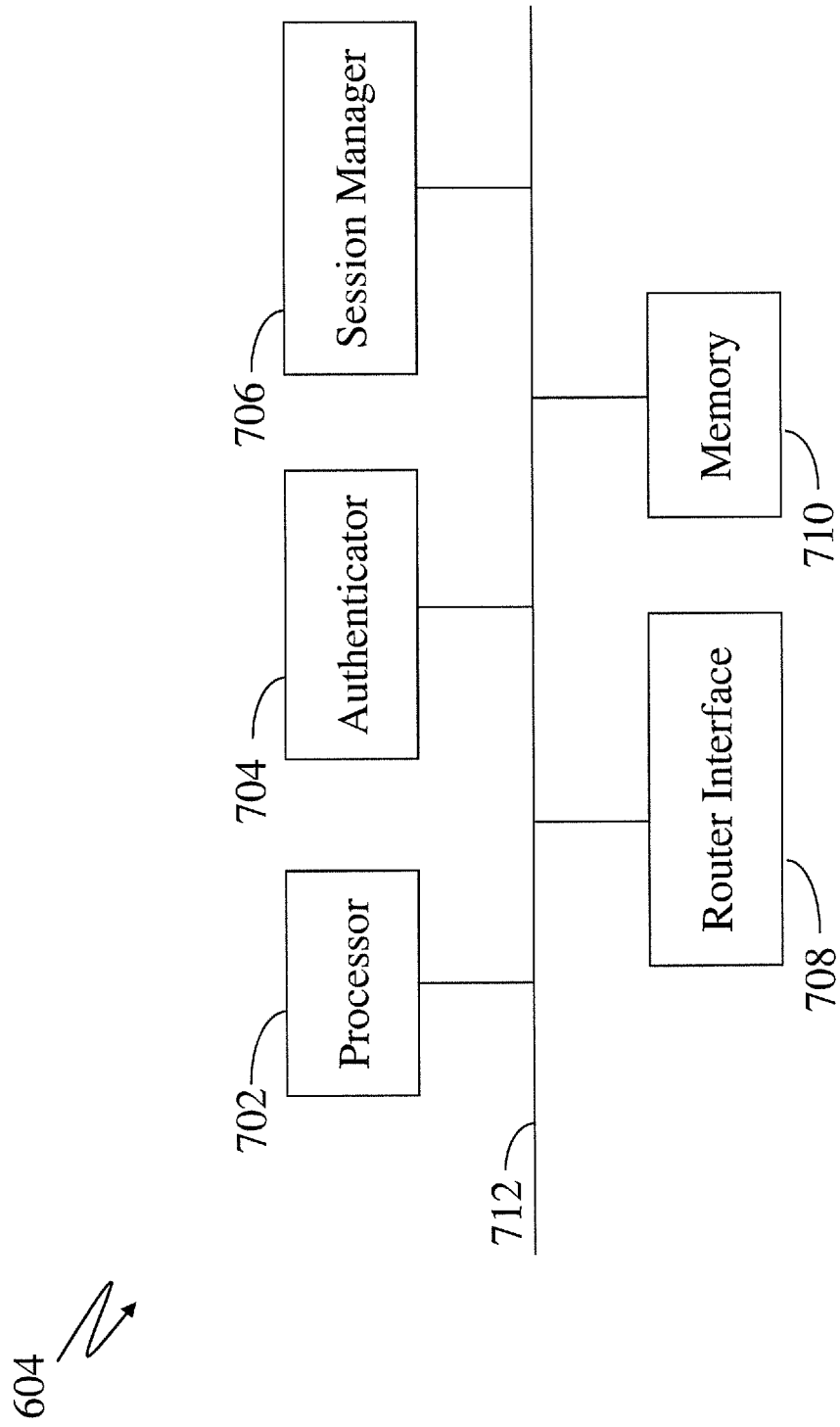
FIG. 7 shows a block diagram of an exemplary authenticator/session proxy.

FIG. 7 shows a block diagram of an exemplary authenticator/session proxy 604 that may include a processor 702, an authenticator 704, a session manager 706, a router interface 708, and a memory 710. All of these components may be coupled together by bus 712. Although a bus-architecture is shown as an example, other component interconnections may be used as is well known. For example, a parallel connection between components may be used where high bandwidth may be required or where tight timing requirements are present. However, for low bandwidth and/or loose timing situations, serial connections may be used. Processor 702, authenticator 704, session manager 706, and/or router interface 708 may be implemented using various technologies such as PLAs, PALs, applications specific integrated circuits (ASICs), off the shelf processors, and/or software executed in one or more general purpose or special purpose processors using one or more CPUs, for example. Memory 710 may be implemented using hard disk, optical disk, and/or RAM/ROM in either volatile or nonvolatile technologies.

After authenticator 704 receives and authenticates a connection-request from client 104, processor 702 generates a session-request based on the payload information obtained from the connection-request received from client 104 and information retrieved from memory 710. For example, the payload information may indicate which communication channels of client 104 are open for listening. Memory 710 may include encryption algorithms, redirector-patterns, and hashing algorithms that may be used in connection with the session-request. Redirector-patterns may be selected by selecting pseudo-random number seeds, for example. Pseudo-random number seeds used in downstream redirectors 108-124 may be indirectly selected via selection of specific code words or information imbedded in a payload of a session-request. Additionally, server identities, passwords and biometric information may be imbedded in the payload information as authentication credentials so that client 104 may authenticate server 106, as discussed below.

Figure 4:
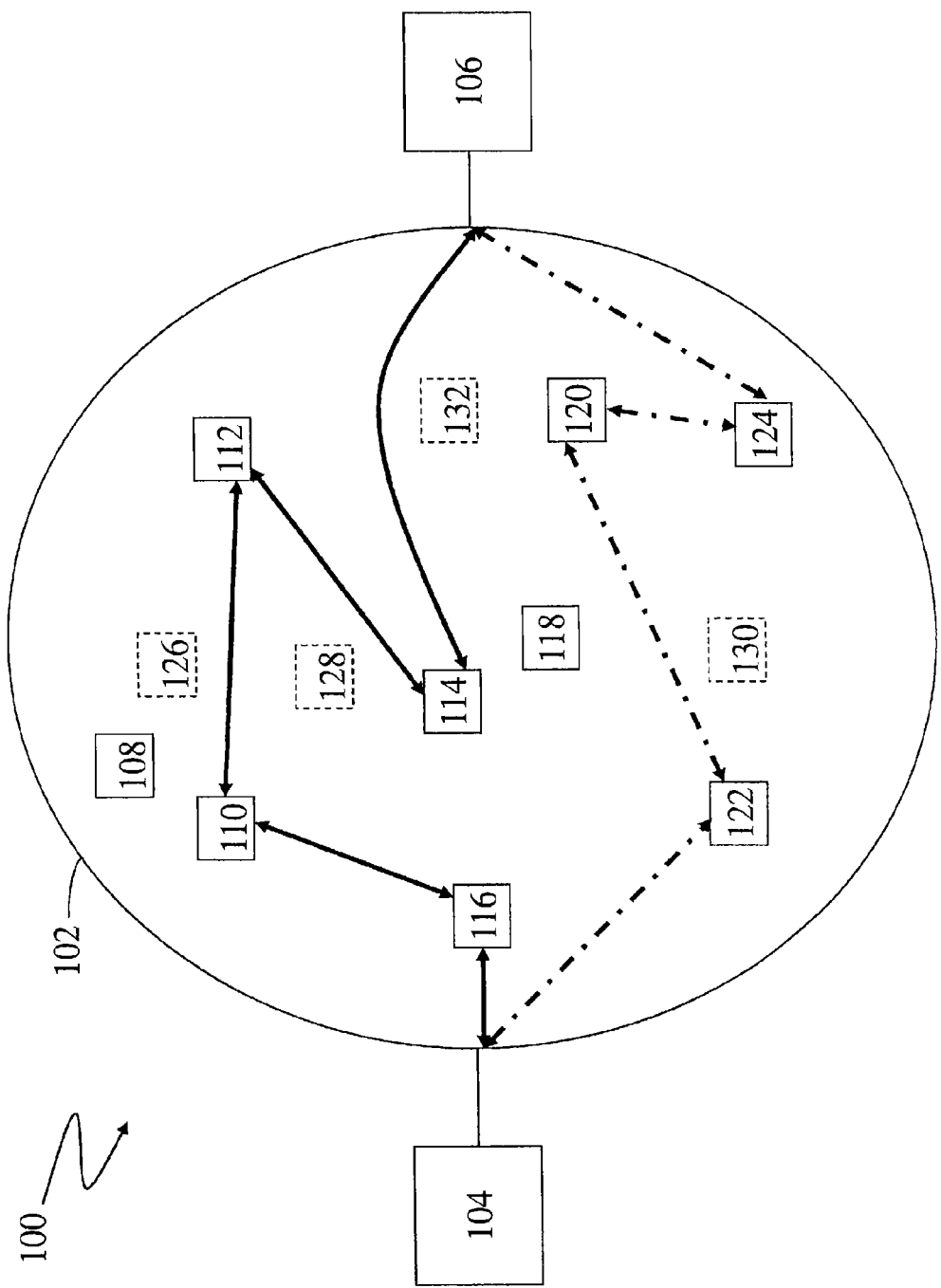
FIG. 4 shows exemplary tunnels for session communication.

A session-request may be similar to a connection-request as discussed in the 176 application and shown in FIGS. 3A-3C of that application. For example, code-words may be imbedded in the session-request at locations that client 104 may discover based on pseudo-random seeds that was provided in the payload of the connection-request, for example. As discussed in the 176 application, the code-words may be a token that is hashed using one of several hashing algorithms. Additionally, the session-request may include usernames and/or passwords that are imbedded at pseudo-randomly selected locations in a session-request payload. Code-words may be decrypted as shown in FIG. 4 of the 176 application. After decryption of the code-word, client 104 may discover one or more locations of the usernames and/or passwords based on session-request-parameters in its memory selected based on a redirector-pattern that the session-request traversed through network 102 so far, for example. The payload portion of the session-request may be encrypted by a pseudo-randomly selected encryption algorithm so that security is increased. The session-request may include a portion that indicates which one or more receiving-channels of client 104 are final destinations. The final destinations may be pseudo-randomly selected from a list of open channels indicated by client 104 in the connection-request.

After being generated, the session-request may be transmitted through router interface 708 to pseudo-randomly selected one or more redirectors 108-124 which then modify the session-request. Redirectors 108-124 may have a block diagram similar to that of server 106 shown in FIG. 6 and passively listen to selected open channels. When a session-request is received, a redirector first decodes the one or more code-words, and authenticates the session-request by decoding and confirming a redirector-pattern constructed so far. After authentication, the redirector-pattern may be used to determine whether its role is as a final destination server or a further redirector. Then, if authenticated, the session-request is modified by at least adding its identity to a list of redirectors so that either client 104 or server 106 can determine a redirector-pattern, and transmitting the modified session-request through a router interface to further redirectors 108-124 or to client 104. As noted above, selection of next redirectors 108-124, client 104, and/or server 106 may be pseudo-randomly determined based on pseudo-random number seeds obtained from the session-request payload and/or indicated by information in the session-request, for example. In this way, redirector-patterns may be controlled.

After transmission of the session-request, processor 702 may wait for an amount of time before commencing a tunnel set-up process. The amount of wait time may be determined based on detected network delays for transmitting session-requests or based on a table of wait times that is indexed by entity identities, entity network locations, and/or entity geographical locations of client 104 and/or server 106, for example. After the wait time expires, processor 702 may instruct session manager 706 to begin tunnel set-up for session communications.

When setting up a first tunnel for a session, session manager 706 selects session-parameters from memory 710. The session-parameters may include time parameters T, $t_j$, and $\tau_j$ appropriate for the geographical and network locations of client 104 and server 106 and current estimated hacking time, for example. A table for each of these time parameters may be provided so that session manager 706 may pseudo-randomly select a time parameter from each of the appropriate tables, so that consecutive ones of the time parameters may not be the same. For example, session duration time T may vary from 20 minutes to 30 minutes from session to session; tunnel duration time $t_j$ may vary from 4 minutes to 8 minutes for consecutive tunnels, and time delay $\tau_j$ for the start of a next tunnel may vary from 1 to 3 minutes. The tables may be generated by an algorithm that incorporates past experiences, calculated hacking risks, etc.

Additionally, the session-parameters may include pseudo-randomly selected identifications of encryption algorithms, hashing algorithms, pseudo-random number generating seeds, network protocols, tokens, biometric data, usernames, passwords, etc. that may be used for each of the tunnels, so that each tunnel may be unique. For example, network protocols may include well known protocols such as VPN, SSH, TLS or SSL, IPSec, or other proprietary protocols. For each tunnel, one of the protocols may be pseudo-randomly selected and applied to the operation of that specific tunnel. The selection of the session-parameters may be coordinated with client 104 based on information in the connection-request. For example, the connection-request may include one or more pseudo-random number seeds that may be used to select a subset of session-parameters from a universe of possible session-parameters for system 100. The selection of session-parameters may also be based on a redirector-pattern traversed by the connection-request, for example. Once selected, the session-parameters may be stored in memory 710 in the form of tables, for example, and used for all tunnels of the session.

After the session-parameters are stored in memory 710, session manager 706 generates a tunnel-request based on the session-parameters that includes authentication data similar to that used for the connection-request and/or the session-request, and transmits the tunnel-request toward client 104 via redirectors 108-124. The tunnel-request may include a tunnel-identification and, in its payload, information relating to the session duration T, tunnel times $t_j$, and time delay $\tau_j$ for starting a next tunnel so that client 104 may control communications with server 106 appropriately such as data block lengths, and communication error detection, for example. Additionally, the tunnel-request may include indications of which receive channels in the server will be used to receive data from client 104. These receive channels may change from tunnel to tunnel. The tunnel-identification may uniquely identify a particular tunnel, so that redirector-patterns for the tunnel may remain the same for the duration of the tunnel.

When a redirector 108-124 receives a tunnel-request, the request is first authenticated in a similar manner as authentication for the connection-request and the session-request, for example, and redirector 108-124 modifies the tunnel-request by at least adding its identity, further modifies the tunnel-request by pseudo-randomly selecting destinations such as another redirector 108-124 including client 104 and/or server 106, and transmits the tunnel-request to toward client 104. Client 104 and server 106 may act as a redirector for its own requests. The tunnel-identification and tunnel-parameters may be saved so that future communication using the identified tunnel may be quickly processed without changing the redirector-pattern, the encryption algorithm, etc., for example.

After the tunnel set-up has reached client 104, a tunnel set-up complete signal may be sent by client 104 to commence communication between client 104 and server 106. If such a signal is planned, server 106 may set a maximum time that a tunnel-set up process may require. If the maximum time is exceeded, then server 106 may place a failure message in a log for later analysis to determine if intruders may be involved. The tunnel set-up complete signal may also confirm the tunnel-identification, for example.

If a tunnel set-up complete signal is received, then the newly set-up tunnel is assigned as a current tunnel and all new communications from server 106 to client 104 are steered to the current tunnel identified by the tunnel-identification. Parameters associated with the current tunnel may be saved in memory 710 so that appropriate tunnel-identification, authentication, encryption and protocol may be used for further communication using the current tunnel. The prior tunnel may be kept open for a period to time to permit all prior communications to complete before shutting the prior tunnel down. The amount of time that the prior tunnel remains open may be set by information in the tunnel-request or by prior communications through the tunnel.

A communication between client 104 and server 106 through a tunnel may not require authentication as discussed above in connection with a connection-request, a session-request or a tunnel-request. The communication is encrypted using an encryption algorithm determined during tunnel set-up. An unencrypted portion of the communication may include a tunnel-identification so that a receiving entity 104-124 may immediately identify the encryption algorithm to use if content of the communication needs to be accessed. Otherwise, the communication is forwarded to a next entity 104-124 based on the saved redirector-pattern.

Figure 8:
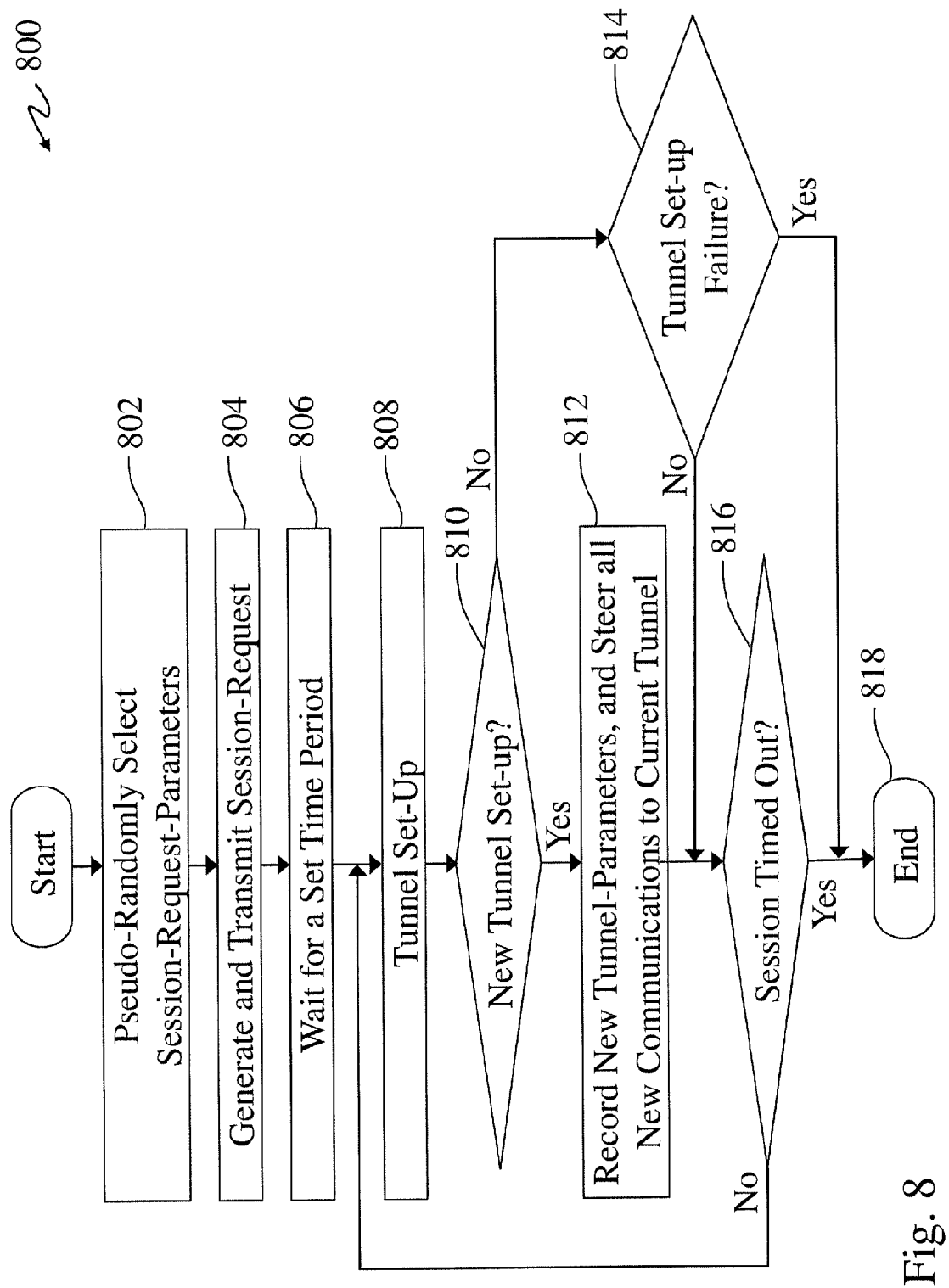
FIG. 8 shows a flowchart of the exemplary authenticator/session proxy.

FIG. 8 shows a flowchart 800 of an exemplary process of authenticator/session proxy 604. In step 802, the process pseudo-randomly selects session-request-parameters from memory 710, and goes to step 804. As noted above, session-request-parameters may include tokens, usernames, passwords, encryption algorithms, pseudo-random number seeds, etc. that may be used to generate a session-request and tunnel-requests. In step 804, the process generates and transmits a session-request toward client 104, and the process goes to step 806. A session-request may have any similarities to a connection-request as disclosed in the 176 application. For example, hashed code words may be imbedded at pseudo-randomly selected locations for initial authentication of the session-request by client 104. Usernames, passwords and/or biometric information may also be imbedded as authentication credentials. The session-request may indicate as destination channels based on information received in the connection-request.

In step 806, the process waits for a set time period and goes to step 808. The amount of time that the process waits may be based on estimated network delay times for the session-request to traverse network 102 and/or based on a table of wait times that is indexed by entity identities, entity network locations, and/or entity geographical locations of client 104 and/or server 106, for example. In step 808, the process performs tunnel set-up and goes to step 810. Tunnel set-up is discussed in detail below. In step 810, the process determines whether the tunnel set-up has been completed. If the tunnel set-up has been completed, the process goes to step 812. If the tunnel set-up has not been completed, the process goes to step 814. In step 812, the process records the new tunnel-parameters, steer all new communications with client 104 to the new tunnel as the current tunnel, and the process goes to step 816. In step 814, the process determines whether there is a tunnel set-up failure. If there is a tunnel set-up failure, the process goes to step 818 and ends. If there is no tunnel set-up failure, the process goes to step 816. In step 816, the process determines whether the session has timed out. If the session has timed out, the process goes to step 818 and ends. If the session has not timed out, the process returns to step 808.

Figure 9:
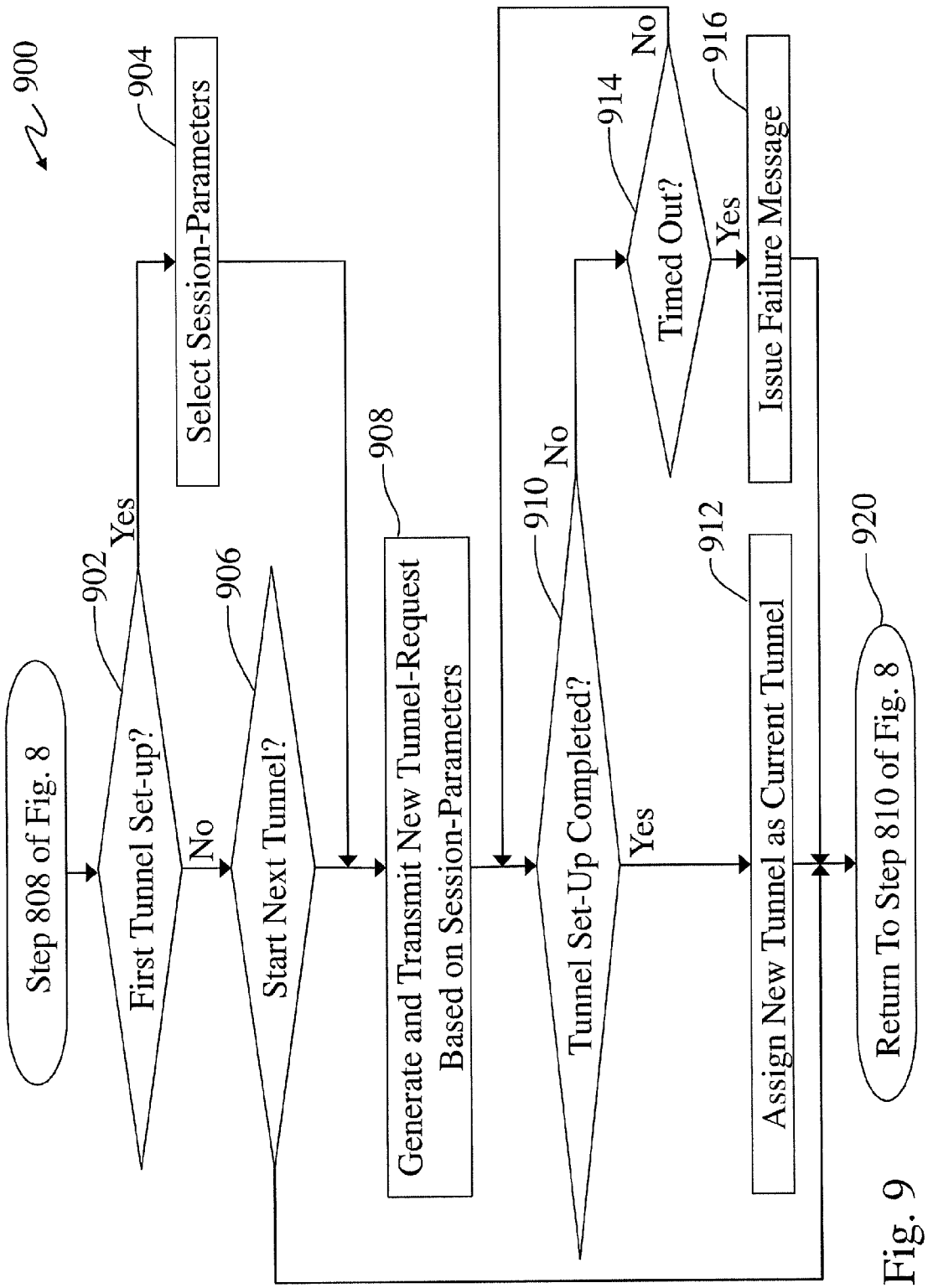
FIG. 9 shows a flowchart of an exemplary tunnel set-up process.

FIG. 9 shows a flowchart 900 of an exemplary process of step 808 of FIG. 8. In step 902, the process determines whether a first tunnel of the session is being set-up. If a first tunnel is being set-up, the process goes to step 904. If a tunnel subsequent to the first tunnel is being set-up, the process goes to step 906. In step 904, the process selects session-parameters and goes to step 908. As noted above, session-parameters may include times such as session duration time T, tunnel duration time $t_j$, and tunnel start delay time $\tau_j$. A table may be associated with each of these times, so that a specific time may be pseudo-randomly selected. Session-parameters may also include identification of encryption algorithms, hashing algorithms, pseudo-random number generating seeds, network protocols, biometric data, usernames, passwords, etc. In step 906, the process determines whether it is time to start a subsequent tunnel based on the delay time associated with the current tunnel. If a new subsequent tunnel should be started, the process goes to step 908. If a subsequent tunnel should not be started, the process goes to step 920 which in turn goes to step 810 of FIG. 8.

In step 908, the process generates and transmits a new tunnel-request based on the session-parameters, and the process goes to step 910. As discussed above, a tunnel-request may include authentication information similar to that of a connection-request or a session-request. Thus, code words may be imbedded at pseudo-random locations, redirectors 108-124 may be pseudo-randomly selected to form a redirector-pattern for authentication, etc. In step 910, the process determines whether a tunnel has been set-up in response to the tunnel-request. If a tunnel has been set-up, the process goes to step 912. If a tunnel has not been set-up, the process goes to step 914.

As discussed above, client 104 may transmit a tunnel-complete signal through the new tunnel indicating that a tunnel has been set-up in response to the tunnel-request. If a tunnel-complete signal is implemented, this signal is used to trigger the process moving from step 910 to step 912. If the tunnel-complete signal is not implemented, the process goes from step 910 to step 912 if a communication from client 104 is received through the requested tunnel. If no communication has been received from client 104 through the tunnel, the process goes to step 914. In step 914, the process checks if a maximum time for completing the requested tunnel has expired. The maximum tunnel set-up time may be determined based on estimated network congestion and/or past experience, for example. If the maximum time has expired, the process goes to step 916 and issues a failure message, and the process goes to step 920 and returns to step 810 of FIG. 8. If the maximum time has not expired, the process returns to step 910.

Figure 10:
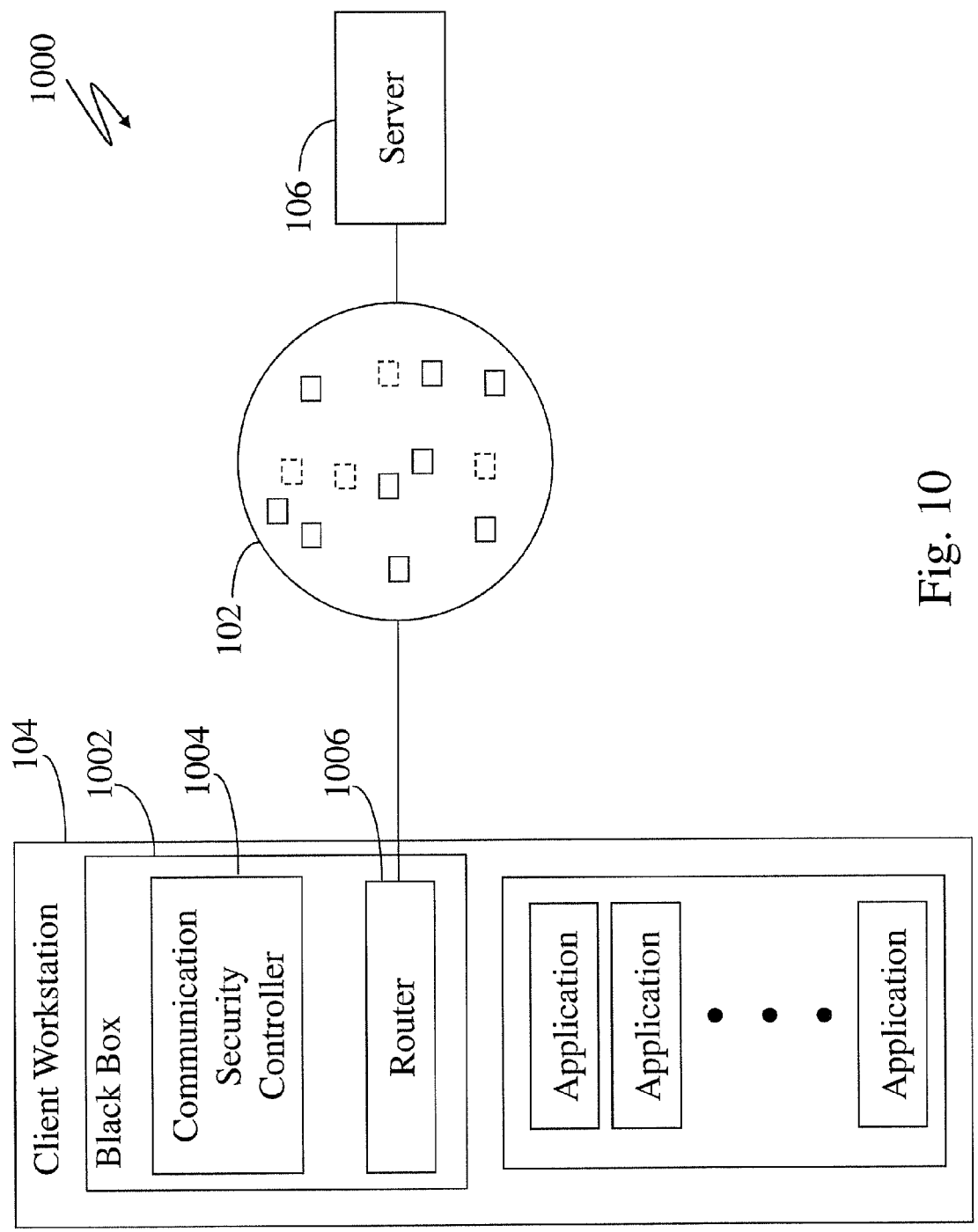
FIG. 10 shows a block diagram of an exemplary client workstation.

FIG. 10 shows an exemplary diagram of client 104. In this diagram, client 104 is shown as a client workstation 104 that includes a black box 1002 and applications. Black box 1002, includes a communication-security controller 1004 and a router 1006. Client 104 is connected to network 102 through router 1006. As noted earlier, client 104 may be any equipment but is shown as a workstation as an example.

Figure 11:
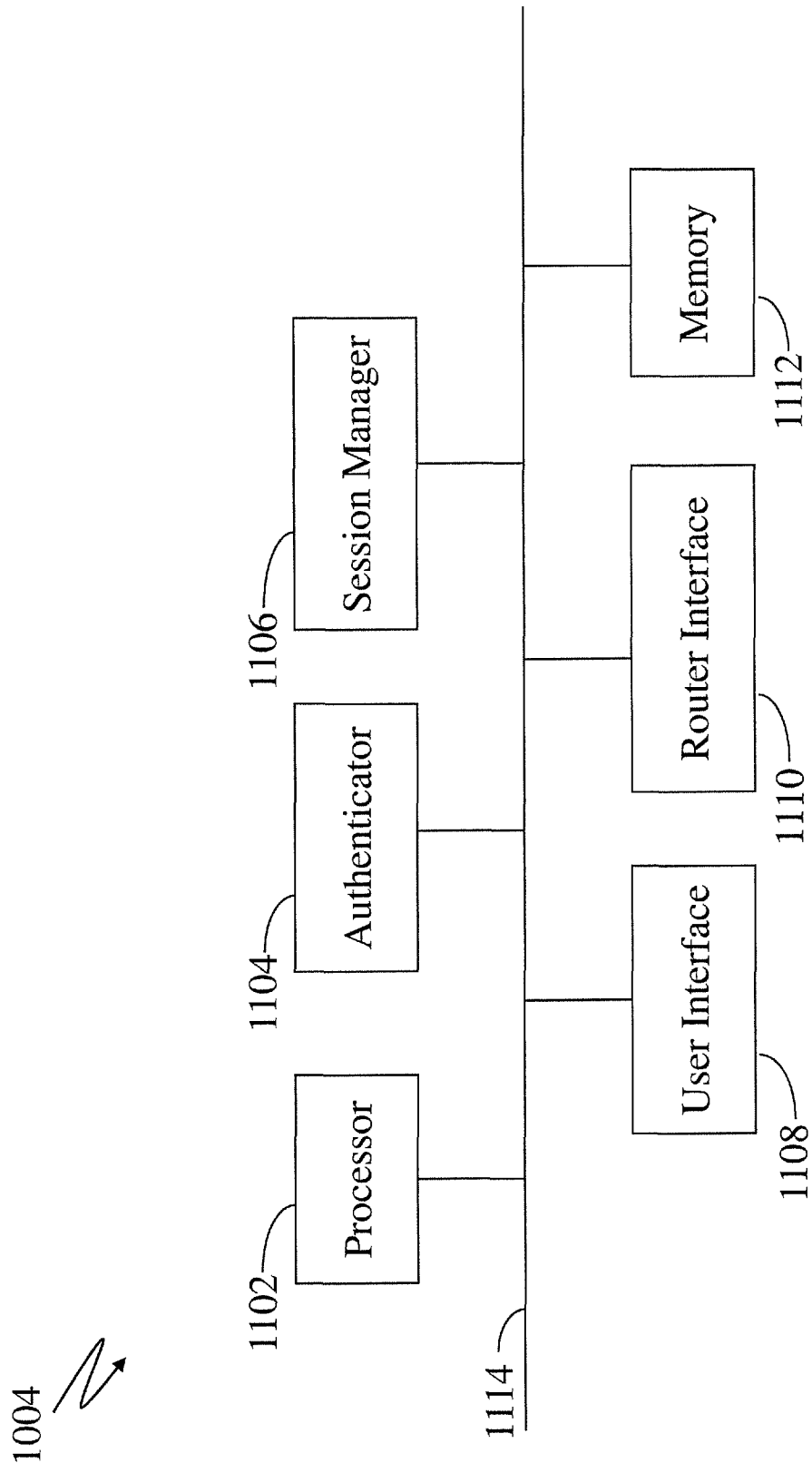
FIG. 11 shows a block diagram of an exemplary communication security controller.

FIG. 11 shows an exemplary block diagram of black box 1004 that includes a processor 1102, an authenticator 1104, a session manager 1106, an user interface 1108, a router interface 1110 and a memory 1112. Similar to authenticator/session proxy of server 106 discussed above, these components may be coupled together by bus 1114. Although a bus-architecture is shown as an example, other component interconnections may be used as is well known. For example, a parallel connection between components may be used where high bandwidth may be required or where tight timing requirements are present. However, for low bandwidth and/or loose timing situations, serial connections may be used. Processor 1102, authenticator 1104, session manager 1106, user interface 1108, and/or router interface 1110 may be implemented using various technologies such as PLAs, PALs, applications specific integrated circuits (ASICs), off the shelf processors, and/or software executed in one or more general purpose or special purpose processors using one or more CPUs, for example. Memory 1112 may be implemented using hard disk, optical disk, and/or RAM/ROM in either volatile or nonvolatile technologies.

After a connection-request is transmitted, processor 1102 may command router 1006 through router interface 1110 to open selected channels to be in passive listening mode without response to any communication directed to the selected channels. This action places client 104 in a passive listening posture to receive a session-request but without giving any external indication of activity. When a session-request is received, processor 1102 sends the received session-request to authenticator 1104 for authentication. In this example, a similar authentication process is performed as disclosed in the 176 application, but any authentication may be performed. As noted earlier, this is a reverse-authentication where the client that requested a service from server 106 reverse-authenticates a server response to the original request.

Authenticator 1104 searches for and decodes code words imbedded in the session-request and extracts a redirector pattern as traversed by the session-request through network 102. Authenticator 1104 confirms that the redirector-pattern is valid, and based on the redirector-pattern, retrieves decryption information from memory 1112 to decrypt the remainder of the session-request. Further authentication may be performed such as checking for valid usernames, passwords, biometric information, etc. Once authentication is achieved, processor 1102 turns control over to session manager 1106 to manage communication through tunnels to server 106. If authentication could not be achieved within a preset amount of time, authenticator 1104 may issue a connection failure message that may be sent to user through user interface 1108.

Before a first tunnel-request is received from server 106, session manager 1006 commands router 1006 through router interface 1110 to open selected channels to passively listen for tunnel-requests. The channels may be selected based on information in the session-request and/or information used to generate the original connection-request. When a tunnel-request is received from server 106, session-manager 1106 may perform authentication by decoding one or more code words, select appropriate encryption algorithms to decrypt the tunnel-request, perform further authentication such as confirming usernames, passwords, and/or biometric information as authentication credentials, for example, and store tunnel information that may be included in a payload. Tunnel information may include tunnel-identification, session duration, tunnel duration and time delay for starting subsequent tunnels.

After the above discussed process is completed, all new communications to server 106 are steered through the new tunnel as the current tunnel. If the new tunnel is the first tunnel, then a message may be sent to the user and/or application to indicate that communication may begin. When a subsequent tunnel-request is received, the subsequent tunnel-request is authenticated as discussed above. All new communications are steered to the newly set-up tunnel as the current tunnel. All communications that have already started in the prior tunnel will be allowed to complete, and afterwards, the prior tunnel may be deleted by removing tunnel information from memory 1112.

Session-manager may set a maximum time to wait for the first tunnel-request. If the first tunnel-request is not received within the maximum time, then a communication failure message may be issued. After receiving a tunnel-request, timers may be set based on time duration information extracted from the payload of the tunnel-request. Tunnel time durations may be forwarded to the user or applications so that size of data transmissions may be appropriately adjusted.

Figure 12:
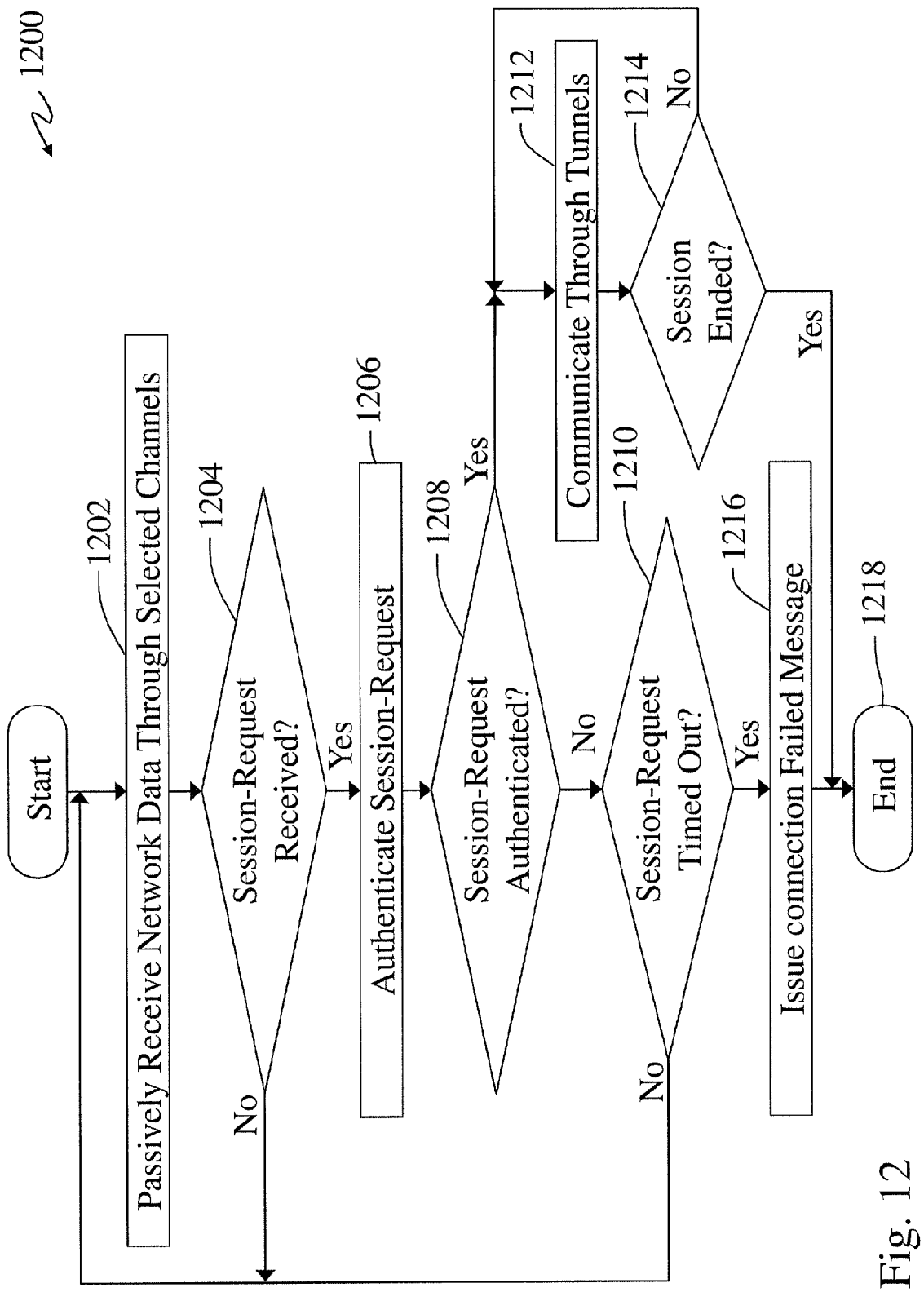
FIG. 12 shows a flowchart of an exemplary process for authenticating a session request.

FIG. 12 shows a flowchart 1200 of an exemplary process for communication-security controller 1004. In step 1202, the process passively receives network data through selected channels, and goes to step 1204. Router 1006 may be instructed not to respond to any communication that has one of its channels as a destination, so that passive reception is achieved. In step 1204, the process checks if a session-request has been received. If a session-request has been received, the process goes to step 1206. If a session-request has not been received, the process returns to step 1202. In step 1206, the process authenticates the session-request by decoding imbedded one or more code words and/or confirming a redirector-pattern, one or more usernames, one or more passwords, etc., and the process goes to step 1208.

In step 1208, the process determines whether the session-request has been authenticated. If the session-request has been authenticated, the process goes to step 1212. If authentication failed, the process goes to step 1210 If authentication failed, the process may also save information relating to the session-request for further analysis. In step 1212, the process begins a communication process and goes to step 1214. The communication process is discussed in detail below. In step 1214, the process determines whether the session has timed out and ended. If the session ended, the process goes to step 1218 and ends. If the session has not ended, the process returns to step 1212. In step 1210 the process determines if a maximum time for the session-request to be received has expired. If the maximum time has expired, the process goes to step 1216 which issues a connection failed message to the user, for example, and goes to step 1218 and ends. If the maximum time has not expired, the process returns to step 1202.

Figure 13:
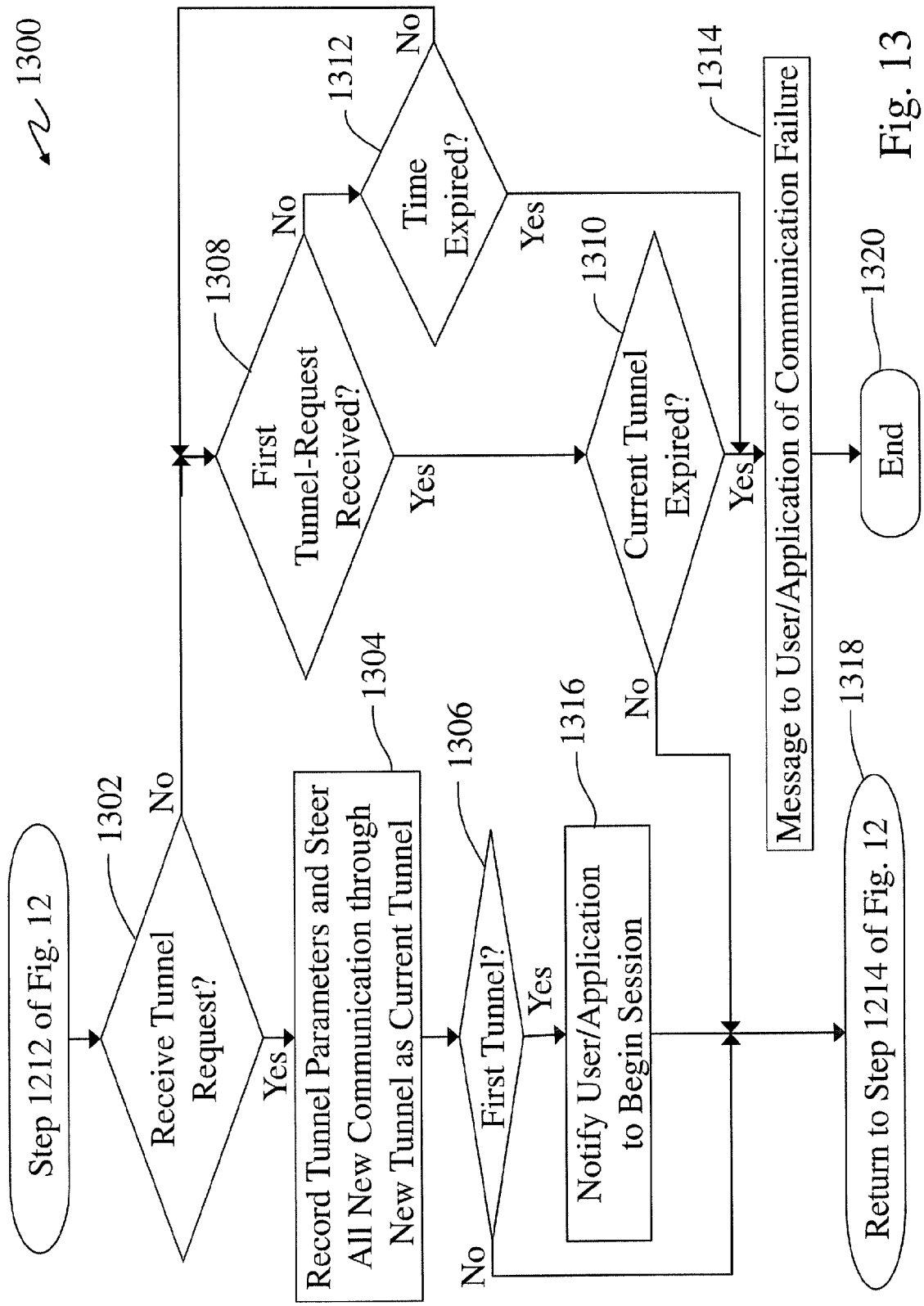
FIG. 13 shows a flowchart of an exemplary client workstation communication process.

FIG. 13 shows a flowchart 1300 of an exemplary process for communications between client 104 and server 106. In step 1302, the process determines whether a tunnel-request has been received. If a tunnel-request has been received, the process goes to step 1304. If a tunnel-request has not been received, the process goes to step 1308. In step 1308, the process determines whether a first tunnel-request has been received. If the first tunnel-request has not been received, then the process goes to step 1312. If the first tunnel-request has been received, then the process goes to step 1310. In step 1312, the process checks if a maximum time for receiving the first tunnel-request has expired. If the maximum time has expired, the process goes to step 1314. If the maximum time has not expired, the process returns to step 1308. In step 1310, the process determines whether the current tunnel-duration has expired. If the current tunnel-duration has expired, then the process goes to step 1314. If the current tunnel has not expired, the process goes to step 1318, which returns to step 1214 of FIG. 12. In step 1314, the process issues a communication failure message to the user and/or application and goes to step 1320 and ends.

In step 1304, the process records tunnel-parameters and steers all new communications through the new tunnel as the current tunnel, and the process goes to step 1306. Tunnel-parameters that are recorded may include a tunnel-identification, for example, that can be used to identify all communications to be transmitted through this tunnel. In step 1306, the process determines if the current tunnel is a first tunnel. If the current tunnel is a first tunnel, the process goes to step 1316. If the current tunnel is not the first tunnel then the process goes to step 1318 and returns to step 1214 of FIG. 12. In step 1316, the process may send a message to the user and/or application that communication with server 106 may begin.

Figure 14:
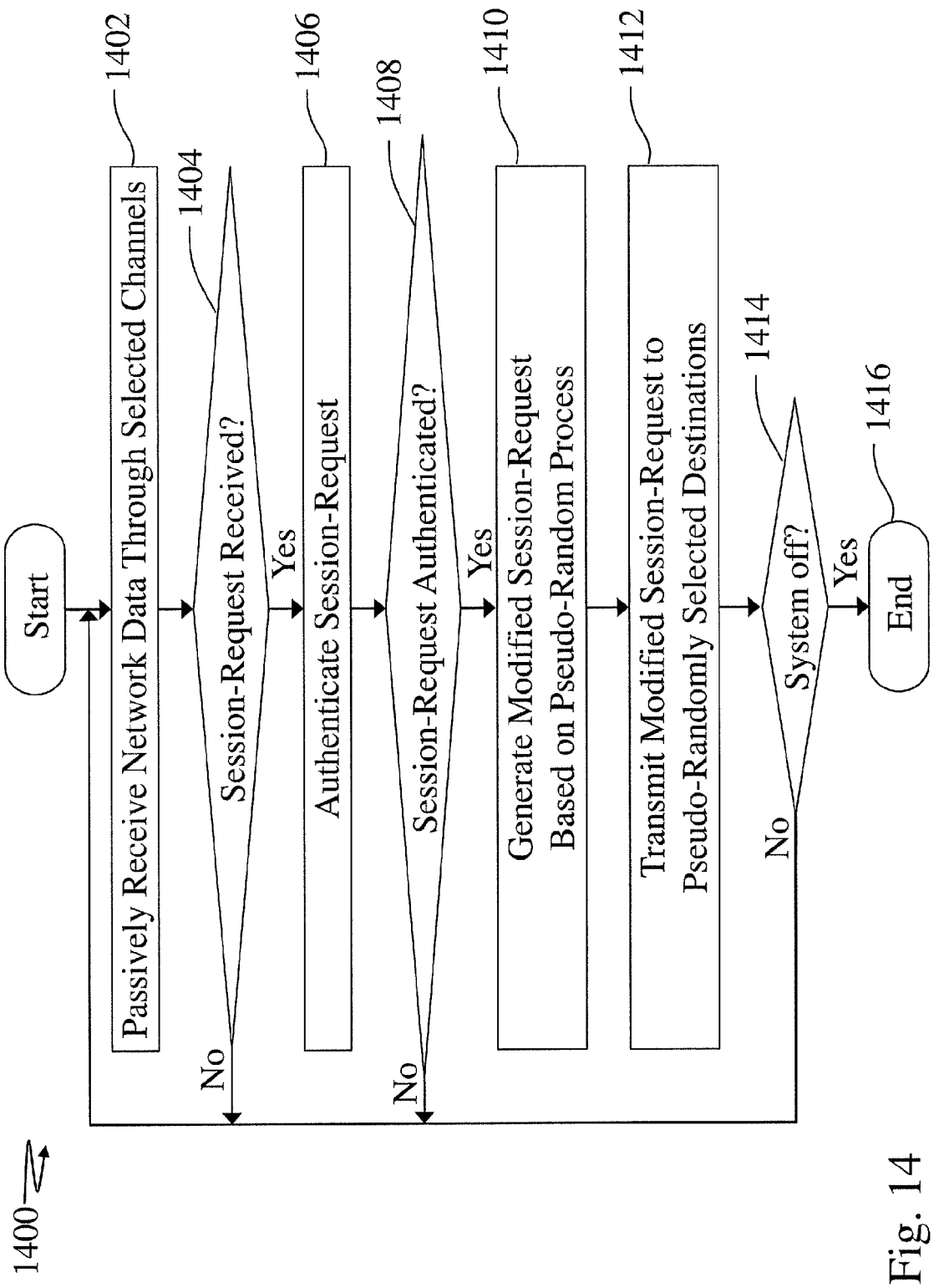
FIG. 14 shows a flowchart of an exemplary redirector process for a session-request.

FIG. 14 shows a flowchart 1400 of an exemplary process of a redirector that redirects a session-request. The redirector may have a block diagram similar to server 106 as shown in FIG. 6. In step 1402, the process passively receives network data through selected channels, and goes to step 1404. In step 1404, the process determines whether a session-request has been received. If a session-request has been received, the process goes to step 1406. If a session-request has not been received, then the process returns to step 1402. In step 1406, the process authenticates the session-request in a similar manner as discussed above, for example, and the process goes to step 1408. Although similar authentication may be performed, different authentication schemes may also be performed by each redirector so that multiple authentication schemes may be used simultaneously for the same session-request. Multiple authentication schemes also may be performed for connection-requests or tunnel-requests.

In step 1408, the process checks if the session-request has been authenticated. If the session-request has been authenticated, then the process goes to step 1410. If the session-request is not authenticated, then process returns to step 1402. The unauthenticated session-request may be saved for intruder analysis, for example. In step 1410, the process modifies the session-request by at least appending the redirector identification to an appropriate portion of the session-request, and pseudo-randomly selects one or more next entity 104-124 to transmit the session-request, and the process goes to step 1412. The pseudo-random selection may be based on seeds that were included in the connection-request associated with the session-request or in the session-request. In step 1412, the process transmits the modified session-request to the pseudo-randomly selected destinations, and goes to steps 1414. In step 1414, the process determines whether the system is off. If the system is off, the process goes to step 1416 and ends. If the system is not off, the process returns to step 1402.

Figure 15:
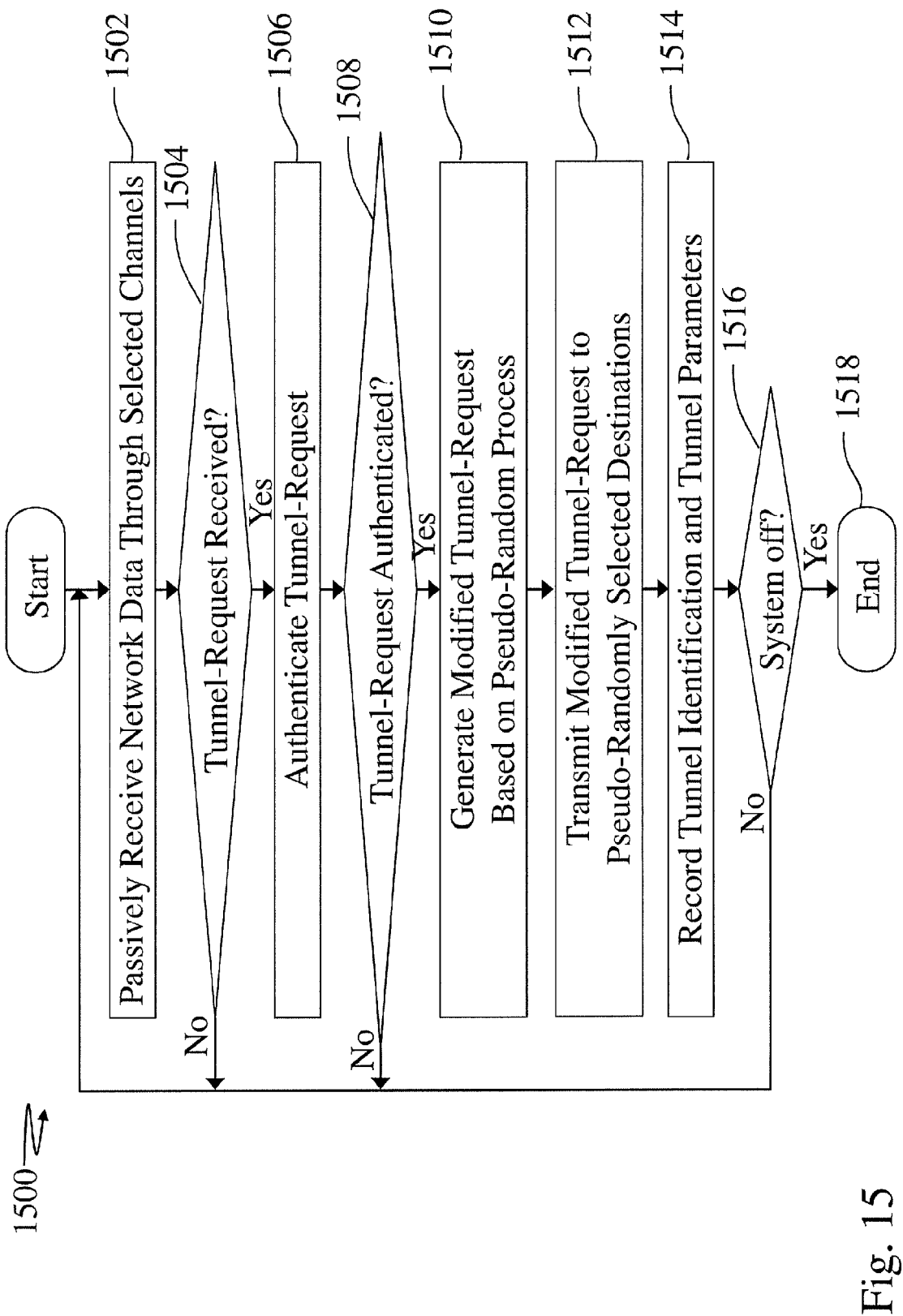
FIG. 15 shows a flowchart of an exemplary redirector process for a tunnel-request.

FIG. 15 shows a flowchart 1500 of an exemplary process of a redirector that redirects tunnel-requests. In step 1502, the process passively receives network data through selected channels, and goes to step 1504. In step 1504, the process determines whether a tunnel-request is received. If a tunnel-request has been received, the process goes to step 1506. If a tunnel-request has not been received, the process returns to step 1502. In step 1506, the process authenticates the tunnel-request and goes to step 1508. In step 1508, the process determines whether the tunnel-request has been authenticated. If the tunnel-request has been authenticated, the process goes to step 1510. If the tunnel-request is not authenticated, the process returns to step 1502. A tunnel-request that failed authentication may also be save for later intruder analysis.

In step 1510, the process modifies the tunnel-request by adding the identity of the redirector and pseudo-randomly changing the destination addresses, for example, transmits the modified tunnel-request, and the process goes to step 1514. In step 1514, the process records a tunnel-identification for the tunnel and tunnel-parameters, and goes to step 1516. In step 1516, the process determines whether the system is off. If the system is off, the process goes to step 1518 and ends. If the system is not off, the process returns to step 1502.

The above process sets up a tunnel identified by the tunnel-identification. If a communication is received from client 104 and/or server 106, the redirector retrieves the recorded tunnel parameters based on the tunnel-identification and forwards the communication to a next redirector 108-124, client 104 or server 106 based on the tunnel-parameters. Thus, after a tunnel is set-up, communication within the tunnel is forwarded without authentication or pseudo-random selections. The redirectors 108-124 act as a conduit in a redirector-pattern that was determined by a path traversed by the tunnel-request that resulted in the tunnel.

Figure 16:
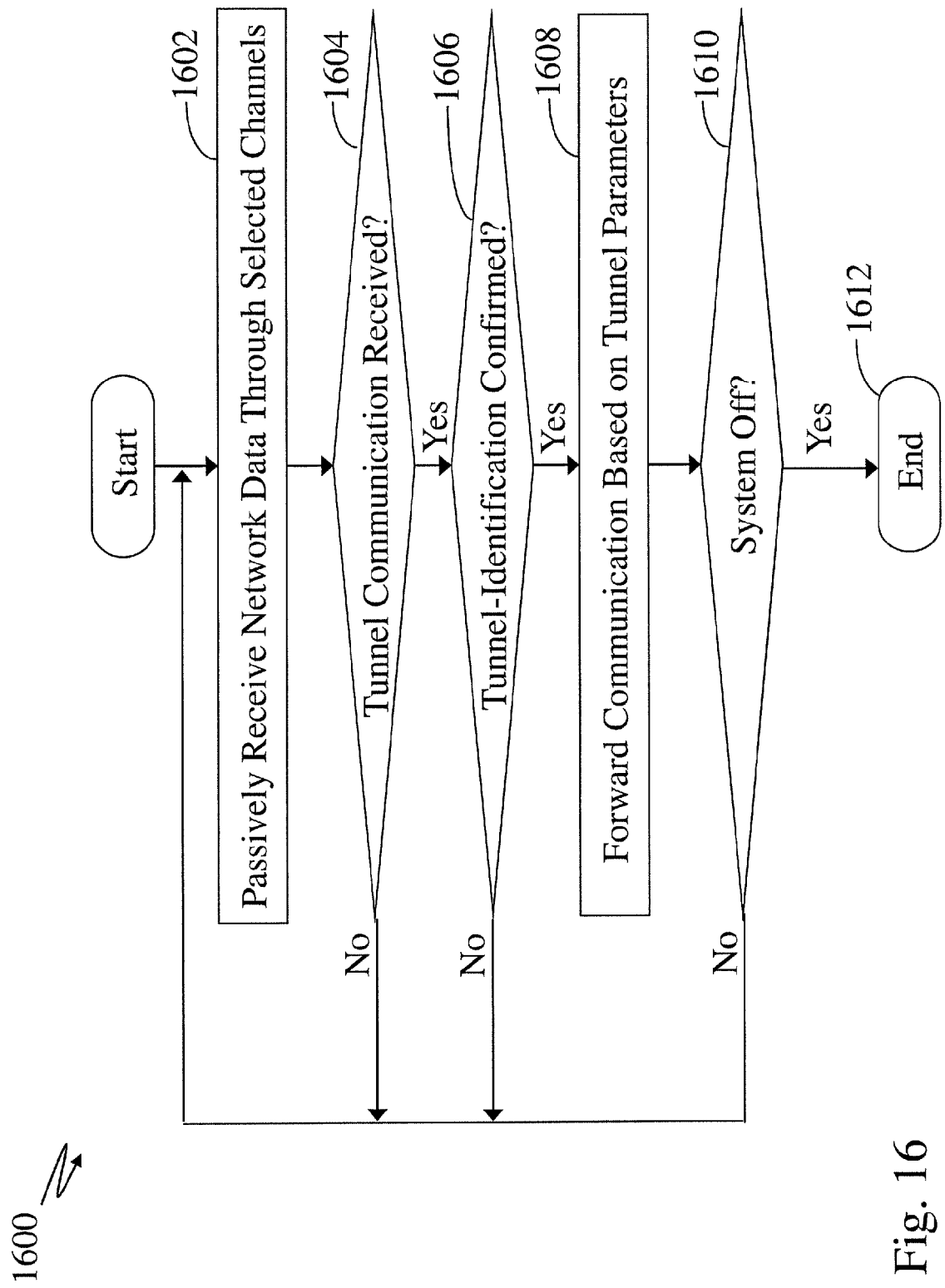
FIG. 16 shows a flowchart of an exemplary redirector process for tunnel communication.

FIG. 16 shows a flow chart 1600 of an exemplary process of a redirector 108-124 for tunnel communications. In step 1602, the process passively receives network data through selected channels, and goes to step 1604. In step 1604, the process determines whether a tunnel communication has been received. If a tunnel communication has been received, the process goes to step 1606. If a tunnel communication has not been received, the process returns to step 1602. In step 1606, the process confirms that a tunnel-identification in the communication is valid. If the tunnel-identification is valid, the process goes to step 1608. If the tunnel-identification is invalid, the process returns to step 1602. The process may also save the invalid tunnel communication for further analysis. In step 1608, the process forwards the tunnel communication to a next entity 104-124 based on the saved tunnel-parameters, and goes to step 1610. In step 1610, the process determines whether the system is off. If the system is off, the process goes to step 1612 and ends. If the system is not off, the process returns to step 1602.

While the invention has been described in conjunction with exemplary embodiments, these embodiments should be viewed as illustrative, not limiting. Various modifications, substitutes, or the like are possible within the spirit and scope of the invention. Although disclosed redirectors may perform authentication functions as disclosed in the 176 application, simpler implementations are possible. For example, routers may be used as redirectors where associative memories may be used to transmit to a set of output channels based on receiving input channels so that session-requests, tunnel-requests and/or tunnel communications may traverse network in predetermined redirector-patterns based on selection of destination channels determined by client 104 or server 106. The routers may append router identification in a list and provide client 104 or server 106 with a router-pattern. In this case, no authentication is performed at the redirectors 108-124, but client 104 and/or server 106 may authenticate based on the router-pattern, and content of the received communication, if redirector/router-pattern authentication is used.

What is claimed is:

1. A network communication system in a network comprising:
   a first electronic device of the network; and
   a second electronic device of the network, the first electronic device configured to transmit a connection-request to the network to begin a session, the connection-request being authenticated by the second electronic device, and then the second electronic device configured to transmit a session-request in response to the connection-request to the network, and the session-request being reverse-authenticated by the first electronic device, based upon at least one redirector-pattern formed by the session-request, by comparing the at least one redirector-pattern to an expected value of the at least one redirector-pattern,
   wherein the at least one redirector-director pattern includes identification information of at least two entities of the network that the session-request traversed between the second electronic device and the first electronic device,
   the first electronic device comprises:
   first authenticator circuitry configured to reverse-authenticate the session-request; and
   first session manager circuitry configured to wait to receive a tunnel-request corresponding to the session-request, and
   the first session manager circuitry is configured to:
   authenticate the tunnel-request,
   record tunnel-parameters, and
   transmit communication data through a tunnel based on the tunnel-parameters.

2. The system of claim 1, wherein
   the second electronic device is configured to transmit the tunnel-request through the network; and
   the first electronic device is configured to form the with the second electronic device in response to the tunnel-request, the tunnel forming a communication path for the session.

3. The system of claim 2 further comprising:
   at least one memory configured to store:
   one or more session time durations;
   one or more geographical regions; and
   a correspondence between the session time durations and the geographical regions,
   wherein the second electronic device is configured to select a session time duration for a geographical region based on the correspondence.

4. The system of claim 2, wherein
   the second electronic device is configured to select a tunnel time duration for the tunnel based on a geographical region, and
   the second electronic device is configured to select a tunnel delay time for each of one or more subsequent tunnels resulting in two tunnels having an overlap in time.

5. The system of claim 1, wherein the tunnel-parameters includes one or more tunnel times, one or more time delays for starting a new tunnel, a tunnel-identity, one or more identifications of encryption algorithms, and one or more identifications of communication protocols.

6. The system of claim 1, wherein the second electronic device comprises:
   second authenticator circuitry configured to authenticate the connection-request; and
   second session manager circuitry configured to select session-parameters, generate the session-request based on the session-parameters, and transmit the session-request to the network.

7. The system of claim 6, wherein the second session manager circuitry is configured to:
   generate the tunnel-parameters based on the session-parameters, the tunnel-request including authentication credentials, and tunnel-parameters that include a tunnel-identity, one or more identifications of encryption algorithms, and one or more identifications of communication protocols; and
   transmit the tunnel-request to the network.

8. The system of claim 7, wherein the second session manager circuitry is configured to:
   generate one or more subsequent tunnel-requests based on the session-parameters; and
   transmit the subsequent tunnel-request at a time that results in an overlap between two tunnels between the first and second entities.

9. The system of claim 1 further comprising a plurality of third electronic devices, wherein at least one third electronic device of the plurality of third electronic devices is configured to:
   receive the session-request;
   authenticate the session-request; and
   transmit a modified session-request to the network.

10. The system of claim 9, wherein the at least one third electronic device is configured to:
    receive the tunnel-request;
    authenticate the tunnel-request;
    record the tunnel-parameters if the tunnel-request is authenticated, the tunnel-parameters including a tunnel-identity;
    receive a communication that identifies a valid tunnel-identity; and
    transmit the communication based on tunnel-parameters corresponding to the tunnel-identity without further authentication.

11. The system of claim 1 further comprising:
    means for generating a session-request;
    means for reverse-authenticating the session-request;
    means for setting up one or more tunnels between the first and second entities using one or more tunnel-requests, wherein if two or more tunnels are generated, at least two tunnels overlap in time; and
    means for communication between the first and second entities using tunnels that are set up by the means for setting up one or more tunnels.

12. A method for communication in a network comprising:
    transmitting a connection-request by a first electronic device to the network;
    authenticating the connection-request in a second electronic device;
    transmitting a session-request by the second electronic device to the network;
    reverse-authenticating the session-request in the first electronic device, based upon at least one redirector-pattern formed by the session-request, by comparing the at least one redirector-pattern to an expected value of the at least one redirector-pattern;
    waiting to receive one or more tunnel-requests corresponding to the session-request;
    authenticating the tunnel-request;
    recording tunnel-parameters; and
    transmitting communication data through a tunnel based on the tunnel-parameters, wherein the at least one redirector-director pattern includes identification information of at least two entities of the network that the session-request traversed between the second electronic device and the first electronic device.

13. The method of claim 12, further comprising:
selecting session-parameters in the second electronic device;
generating the one or more tunnel-requests based on the session-parameters at the second electronic device; and
transmitting the one or more tunnel-requests to the network by the second electronic device to set up tunnels including the tunnel for communication between the first and second electronic devices.

14. The method of claim 13 further comprising:
determining one or more session times, one or more tunnel times, and one or more time delays for starting new tunnels based on geographical location information; and
incorporating the session times, tunnel times and time delays in the session-parameters.

15. The method of claim 12 further comprising:
recording the tunnel-parameters based on the tunnel-request.

16. The method of claim 15, further comprising:
continuing communication between the first and second entities using a first tunnel;
receiving indication that a second tunnel has been set up;
steering all new communications between the first and second entities to the second tunnel; and
deleting the first tunnel after all communications already started using the first tunnel are completed.

17. The method of claim 12 further comprising:
receiving the session-request in a third electronic device;
authenticating the session-request in the third electronic device; and
transmitting a modified session-request to the network.

18. The method of claim 17, further comprising:
receiving the one or more tunnel-requests in the third electronic device;
authenticating the one or more tunnel-requests in the third electronic device;
recording the tunnel-parameters in the third electronic device if the one or more tunnel-requests is authenticated, the tunnel-parameters including a tunnel-identity;
receiving a communication in the third electronic device that identifies a valid tunnel-identity; and
transmitting the communication based on tunnel-parameters corresponding to the tunnel-identity without further authentication.

19. The system of claim 1, wherein the at least one redirector-pattern includes at least two different redirector-patterns formed by the session-request.

* * * * *